(12) United States Patent
Beri et al.

(10) Patent No.: US 10,067,914 B2
(45) Date of Patent: Sep. 4, 2018

(54) TECHNIQUES FOR BLENDING DOCUMENT OBJECTS

(71) Applicant: Adobe Systems Incorporated, San Jose, CA (US)

(72) Inventors: Tarun Beri, Uttar Pradesh (IN); Harish Kumar, Uttar Pradesh (IN); Vineet Batra, Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/335,603

(22) Filed: Oct. 27, 2016

(65) Prior Publication Data

US 2018/0121391 A1 May 3, 2018

(51) Int. Cl.
```
G06T 1/20      (2006.01)
G06F 17/21     (2006.01)
G09G 5/02      (2006.01)
G09G 5/377     (2006.01)
G06T 11/00     (2006.01)
```
(52) U.S. Cl.
CPC ............ *G06F 17/211* (2013.01); *G06T 1/20* (2013.01); *G06T 11/001* (2013.01); *G09G 5/026* (2013.01); *G09G 5/377* (2013.01); *G06T 2210/62* (2013.01); *G09G 2340/06* (2013.01); *G09G 2340/10* (2013.01)

(58) Field of Classification Search
None
See application file for complete search history.

(56) References Cited

U.S. PATENT DOCUMENTS

| 6,020,897 A * | 2/2000 | Carlsen ................... G06T 11/60 |
| | | 345/629 |
| 6,160,923 A | 12/2000 | Lawton et al. |
| 2008/0094410 A1* | 4/2008 | Jiao ....................... G06T 15/503 |
| | | 345/592 |

(Continued)

OTHER PUBLICATIONS

U.S. Appl. No. 14/337,518, "Notice of Allowance", dated Aug. 12, 2016, 7 pages.

(Continued)

*Primary Examiner* — Kee M Tung
*Assistant Examiner* — Yanna Wu
(74) *Attorney, Agent, or Firm* — Kilpatrick Townsend & Stockton LLP

(57) ABSTRACT

Disclosed are various embodiments for performing color blending of document objects using GPU hardware of a computer. A computer obtains a document specifying a first object and a second object presented in the document, where a portion of the second object overlaps the first object. The computer renders, on a display device, a presentation of the document, where the rendered presentation including the first object of the document. In response to determining that the document specifies blending the second object with the first object in the overlapping portion, configuring dual-source color circuitry of a graphics processing unit (GPU) of the computer to compute, via a dual-source color blending operation, a result color for the blended first and second objects. The computer renders, on the display device, the second object of the document using the result color for the overlapping portion.

20 Claims, 6 Drawing Sheets

(56) References Cited

U.S. PATENT DOCUMENTS

2008/0094411 A1\* 4/2008 Parenteau ............. G06T 15/503
    345/592
2015/0110407 A1 4/2015 Sinha et al.

OTHER PUBLICATIONS

Adobe Systems Incorporated, "PDF Reference, sixth edition: Adobe Portable Document Format version 1.7", Nov. 2006, 88 pages.
OpenGL.Org, "Blending, Open GL," http://www.opengl.org/wiki_132/index.php?title=Blending&oldid=13790 Oct. 2016, retrieved Nov. 16, 2016, 6 pages.

\* cited by examiner

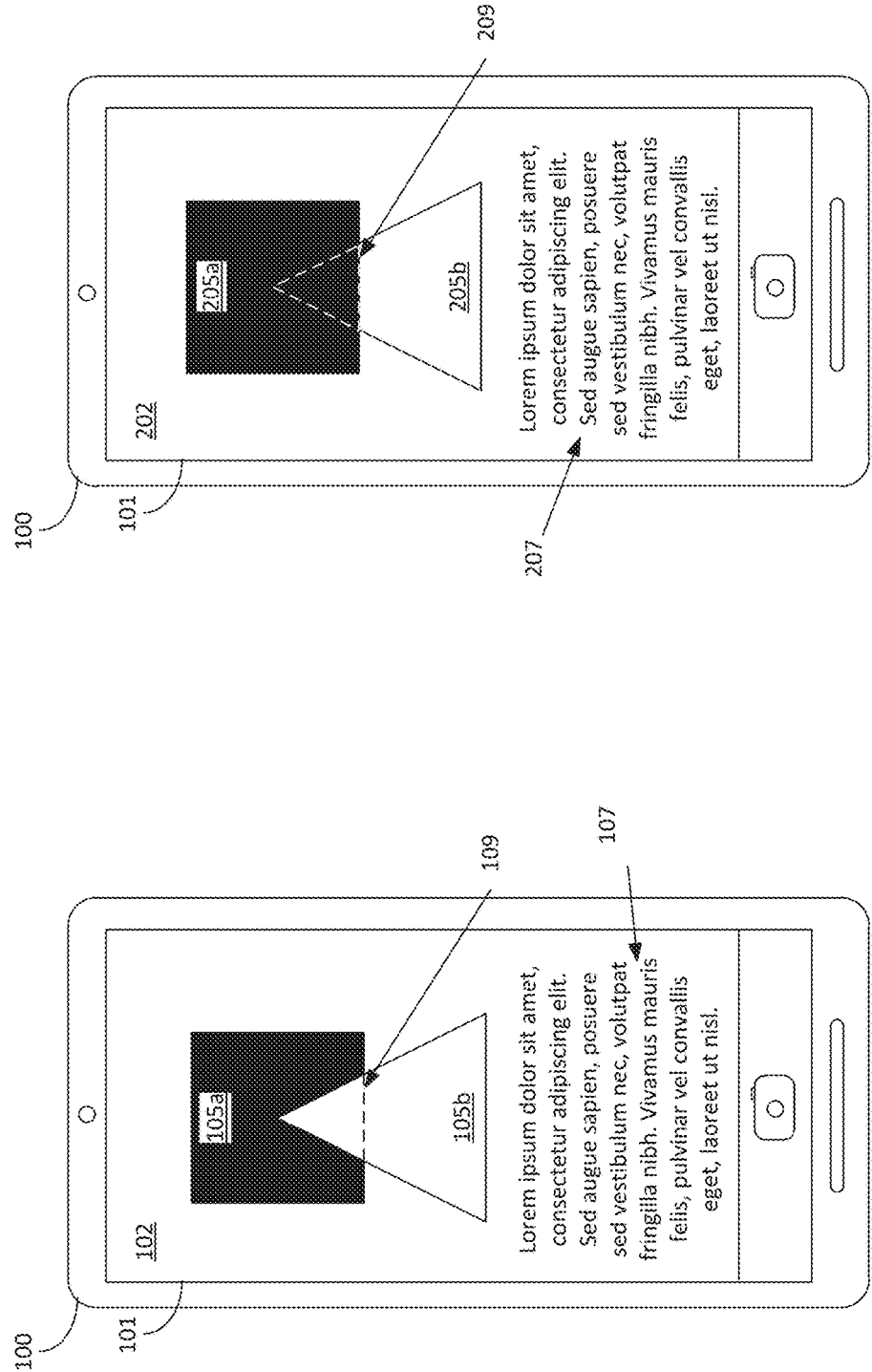

TECHNIQUES FOR BLENDING DOCUMENT OBJECTS

BACKGROUND

Documents, such as documents in the Portable Document Format (PDF), allow various objects (e.g., images) to be inserted within the documents and also allow these objects to overlap within the displayed document. Different blend modes can be defined for objects in a document that determine what color is displayed in overlapped portions of the objects. The color in the overlapped portions is sometime referred to as the "result color" or "resultant color." For PDF documents, the default blend mode is the "Normal" blend mode, while the "Multiply" blend mode is the most commonly used blend mode from among the various ones supported by PDF reference standard.

The different blend modes for objects in document are often not supported directly on graphics processing unit (GPU) hardware and are instead performed in software using fragment shaders of the GPU to perform the calculation. This software implementation is slow as compared to hardware blending. What is needed is a way to perform color blending of objects using GPU hardware.

SUMMARY

Various aspects of the present invention relate to techniques for performing color blending of document objects using GPU hardware of a computing device. To that end, a computing device obtains a document specifying a first object and a second object presented in the document, where a portion of the second object overlaps the first object. A presentation of the document is rendered on a display of the computing device. The rendered presentation includes the first object of the document. In response to determining that the document specifies using a blend mode for blending a color of the second object with a color of the first object in the overlapping portion, the computing device determines a transform of the blend mode function in pre-multiplied alpha mode. A first portion of the transformed blend mode function is assigned to a graphics processing unit (GPU) of the computing device for a source color variable, and a second portion of the transformed blend mode function is assigned to the GPU of the computing device for a dual-source color variable. Each of the first and second portions includes the color of the second object using a pre-multiplied alpha.

The computing device configures the dual-source color circuitry of the GPU with a parameter representing a remaining portion of the transformed blend mode function that includes a destination alpha. The GPU hardware determines a destination color of the overlapping portion. For each pixel of at least the overlapping portion, determining a result color using the dual-source color circuitry of the GPU to compute the transformed blend mode function. The second object of the document is rendered on the display of the computing device, where the second object of the document uses the result color for each pixel of the overlapping portion.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 1-2 are diagrams of an example user interface displaying a document as rendered by a computing device according to various embodiments of the present disclosure.

DETAILED DESCRIPTION

Figure 3:
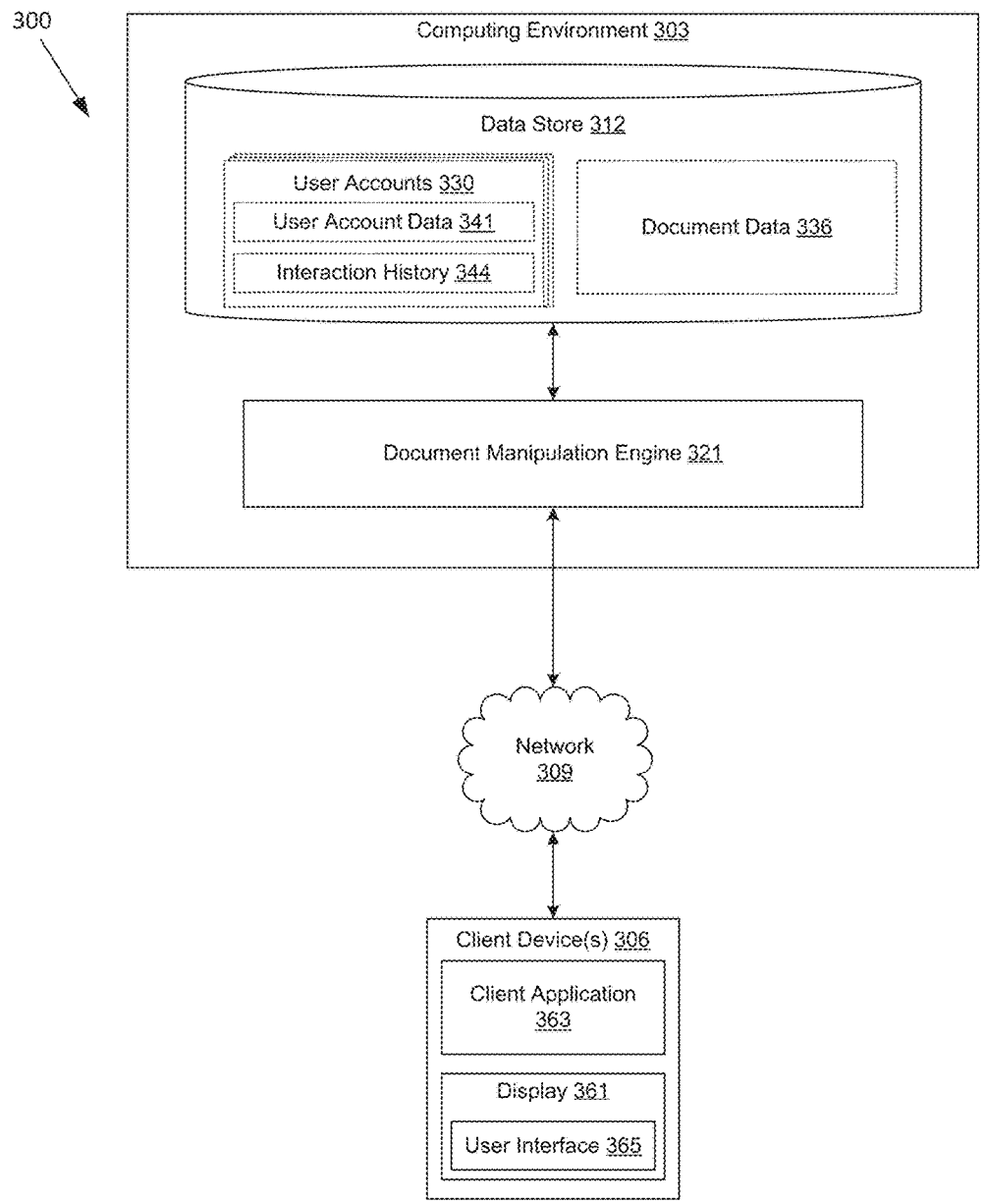
FIG. 3 is a diagram of a networked environment according to various embodiments of the present disclosure.

Disclosed herein are various embodiments for presenting a document that includes overlapping objects whose colors are to be blended in the presentation of the document. For example, a presentation of a document can include blending colors of overlapping portions of images displayed within the document. For an object that the document data indicates should be blended, the resultant color displayed for a given portion of the object is based on the destination color at that location (i.e., background color, including color of any previously drawn objects), the source color of the portion of the object itself, and a blending function that calculates how the source and destination colors should be blended. Using techniques disclosed herein, circuitry of a graphics processing unit (GPU) can be configured to compute the result color(s) for blended objects using a "dual-source color blending" operation performed by GPU hardware. Subsequently, the object may be rendered in the document using the result color(s) determined by the GPU. Although various examples throughout the disclosure may refer to specific blend modes, such as the Multiply blend mode, implemented using specific application programming interfaces (APIs), such as OpenGL™, those skilled in the art can appreciate that the techniques disclosed herein can be applied to other blend modes and/or other APIs to implement a respective blend mode in GPU hardware.

The illustrations of FIGS. 1 and 2 provide examples of documents with overlapping objects presented on a display, with each illustration using a different blend mode for the objects. In particular, FIG. 1 represents a rendering of objects using a Normal blend mode, while FIG. 2 represents an approximate rendering of objects using a Multiply blend mode. The Normal blend mode, Multiply blend mode, and other blend modes are commonly defined for various document formats, such as in the Adobe® PDF Reference standard produced by Adobe Systems, Inc. of San Jose, Calif. that is available at: http://www.adobe.com/content/dam/Adobe/en/devnet/acrobat/pdfs/pdf_reference_1-7.pdf.

As shown in the illustration of FIG. 1, a mobile device 100 uses a display 101 to present a document 102 that includes various objects 105*a-b* and text strings 107. Each of the objects 105*a-b*, square and triangle shapes respectively, has a corresponding color and overlaps with the other in the overlapping portion 109 that is demarked by the dashed line (for illustrative purposes only). The manner in which the mobile device 100 determines the color presented in the overlapping portion 109 is based in part upon the blend mode chosen for the upper layer object, object 105b. The Normal blend mode that is represented in FIG. 1 displays the source color of the upper layer object (i.e., object 105b) while the destination color (also referred to as "backdrop color" or "background color") is ignored. Thus, when the document 102 is displayed, the overlapping portion 109 has a result color that is the same as the color of the object 105b.

As shown in the illustration of FIG. 2, the mobile device 100 uses the display 101 to present a document 202 that includes various objects 205a-b and text strings 207. Each of the objects 205a-b, square and triangle shapes respectively, has a corresponding color and overlaps with the other in the overlapping portion 209 that is demarked by the dashed line (for illustrative purposes only). The manner in which the mobile device 100 determines the color presented in the overlapping portion 209 is based in part upon the blend mode chosen for the upper layer object, object 205b. In the Multiply blend mode generally, the displayed color results from multiplying the destination and source color values. The result color is always at least as dark as either of the two constituent colors. Multiplying any color with black produces black; multiplying with white leaves the original color unchanged. Painting successive overlapping objects with a color other than black or white produces progressively darker colors. Consequently, when the document 202 is displayed, the overlapping portion 209 has a result color that is the product of the source and destination colors. Since the color of the object 205a is black and the RGB color value for black is [0,0,0], the result color is also black regardless of the source color of the object 205b. In the following discussion, a general description of the system and its components is provided, followed by a discussion of the operation of the same.

With reference to FIG. 3, shown is a networked environment 300 according to various embodiments. The networked environment 300 includes a computing environment 303 and a client device 306, which are in data communication with each other via a network 309. The network 309 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks. Although the functionality described herein is shown in the context of the networked environment 300, other implementations are possible, such as implementing the functionality in a single computing device (e.g., desktop computer or mobile device), as a plug-in or auxiliary feature of another service executed in a computing device, and/or in arrangements of computing devices other than those shown in FIG. 3.

The computing environment 303 may comprise, for example, a server computer or any other system providing computing capability. Alternatively, the computing environment 303 may employ a plurality of computing devices that may be arranged, for example, in one or more server banks or computer banks or other arrangements. Such computing devices may be located in a single installation or may be distributed among many different geographical locations. For example, the computing environment 303 may include a plurality of computing devices that together may comprise a hosted computing resource, a grid computing resource and/or any other distributed computing arrangement. In some cases, the computing environment 303 may correspond to an elastic computing resource where the allotted capacity of processing, network, storage, or other computing-related resources may vary over time.

Various applications and/or other functionality may be executed in the computing environment 303 according to various embodiments. Also, various data is stored in a data store 312 that is accessible to the computing environment 303. The data store 312 may be representative of a plurality of data stores 312 as can be appreciated. The data stored in the data store 312, for example, is associated with the operation of the various applications and/or functional entities described below.

The components executed on the computing environment 303, for example, include a document manipulation engine 321, and other applications, services, processes, systems, engines, or functionality not discussed in detail herein. As discussed in detail herein, the document manipulation engine 321 is executed to facilitate displaying and possibly editing documents on a computing device, such as the client device 306.

The data stored in the data store 312 includes, for example, user accounts 330, document data 336, and potentially other data. The document data 336 includes data and metadata that may be stored for various documents in different possible formats, such as Portable Document Format (PDF), Hypertext Markup Language (HTML), eXtensible Markup Language (XML), Scalable Vector Graphics (SVG), Adobe Illustrator Artwork (AI), PostScript (PS), Encapsulated PostScript (EPS), and/or other possible formats as can be appreciated. The metadata can include descriptions, keywords, creation/edit times, and/or other possible information associated with the documents. The document data 336 can also include various attributes and permissions related to user accounts 330 for creating, accessing, modifying, and/or deleting documents. In addition, the document data 336 can include storing one or more versions of a document, such as one version stored before a modification, and a second version of the document stored after the modification. In some implementations, the documents stored in the data store 312 may be stored as files. The individual user accounts 330 may include user account data 341, interaction history 344, and other possible data. The user account data 341 can include user identifiers, user group identifiers, credentials, permissions, associated client devices 306, etc. The interaction history 344 includes a log of the various documents accessed for display and/or modification by a user, the client devices 306 on which the document was accessed, and possibly other information.

The client 306 is representative of various possible client devices that may be coupled to the network 309. The client 306 may comprise, for example, a processor-based system such as a computer system. Such a computer system may be embodied in the form of a tablet computer, a smartphone, a desktop computer, a laptop computer, a set-top box, or other devices with like capability. The client 306 may include connectivity to a display 361. The display 361 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. In some implementations, the display 361 is touch-sensitive.

The client 306 may be configured to execute various applications such as a client application 363 and/or other applications. The client application 363 may be executed in the client 306, for example, to access network content served up by the computing environment 303 and/or other servers, thereby rendering a user interface 365, such as a Graphical User Interface (GUI), on the display 361. To this end, the client application 363 may comprise, for example, a browser, a dedicated application, etc., and the user interface 365 may comprise a network page, an application screen, etc. The client 306 may be configured to execute applications beyond the client application 363 such as, for example, email applications, social networking applications, word processors, spreadsheets, and/or other applications.

Next, a general description of the operation of the various components of the networked environment 300 is provided. To begin, a user operating the client 306 employs the client application 363 to establish a communication session with the document manipulation engine 321. The communication session may be carried out using various protocols such as, for example, HyperText Transfer Protocol (HTTP), Simple Object Access Protocol (SOAP), REpresentational State Transfer (REST), User Datagram Protocol (UDP), Transmission Control Protocol (TCP), and/or other protocols for communicating data over the network 309. In some implementations, the user is authenticated to the document manipulation engine 321 using one or more user credentials.

Thereafter, the user selects a document to be displayed from the user interface 365. In general, a document may specify various different objects that are presented when the document is displayed, such as colors, images (e.g., raster graphics, vector graphics, or a combination of the two), text strings, executable code, etc. Some of these various objects may overlap with other objects in certain portions, whereby the document can specify how the color(s) of each of these overlapping objects should be blended, sometimes referred to as a "blend mode." The Adobe® PDF Reference standard produced by Adobe Systems, Inc. of San Jose, Calif. defines various possible blend modes and is available at: http://www.adobe.com/content/dam/Adobe/en/devnet/acrobat/pdfs/pdf_reference_1-7.pdf. For example, the PDF Reference defines the "Normal" blend mode for an object as producing a resultant color using only the source color for the object and ignoring the destination color (also referred to as background or backdrop color). The PDF Reference also defines the "Multiply" blend mode for an object as producing a resultant color by multiplying the source and destination color values, thereby producing a resultant color that is at least as dark as either of the source or destination colors. Multiplying any color with a source or destination color that is black produces a black resultant color, while multiplying any color with a source or destination color that is white produces a resultant color that is unchanged from the original color.

The various blend modes can also account for alpha values that represent the amount of transparency for a color. For example, the color red may be represented in RGB colors as [255,0,0]. If we seek to draw the color red with a 50% transparency rate, this would translate to an alpha value of 0.5 which is then multiplied by the color, resulting in an RGB color of [127,0,0]. Such a color where its alpha value has been multiplied by its RGB value may be referred to as a "pre-multiplied" color or a color having a "pre-multiplied alpha." Alternatively, a color may also be recorded along with its alpha value, such as in RGBA, where the above red color with 50% transparency may be shown as [255,0,0,127], where the alpha value of 0.5 may also be represented as [127], approximately 50% of an 8-bit value over the range 0 . . . 255. In some implementations, the alpha value may still be stored along with its pre-multiplied color (e.g., [127,0,0,127]) in order to provide the ability to restore the color to its original state, as is sometimes desirable.

In some embodiments, a document, such as one that complies with the Adobe PDF reference, includes the capability to assign various objects to groups that may further modify color blending behavior depending upon the type of group. Each group may be defined as "isolated" type or as a "non-isolated" type. For an isolated group, the objects within the group are rendered without regard to the destination color produced by previous objects and groups that may contain them. For a non-isolated group, the objects are rendered using the color produced by previous objects/groups as the destination color. For example, two groups may be defined, Group 1 and Group 2, where Group 1 is at a lower layer than Group 2. Group 1 may contain one or more objects, while Group 2 contains two objects, O1 and O2, where O1 is the lowest layer object for Group 2. When the document is rendered, the objects in Group 1 are rendered, where each of these object may include its own blend mode. Next, when Group 2 is rendered, if Group 2 is defined as an isolated group, O1 is rendered without regard to the color of previously rendered objects, such as those in Group 1, even if O1 itself uses a blend mode. Alternatively, if Group 2 is non-isolated, then O1 is rendered such that the destination color used for any blend mode specified for O1 is the color of the previously rendered objects.

Thus, as many objects in a document may overlap using different blend modes that interact with the various other layers of objects, a document may maintain a consistent appearance when displayed by first rendering the lowest layer object, then rendering objects at successive layers using the blend mode corresponding to the respective object.

Figure 4:
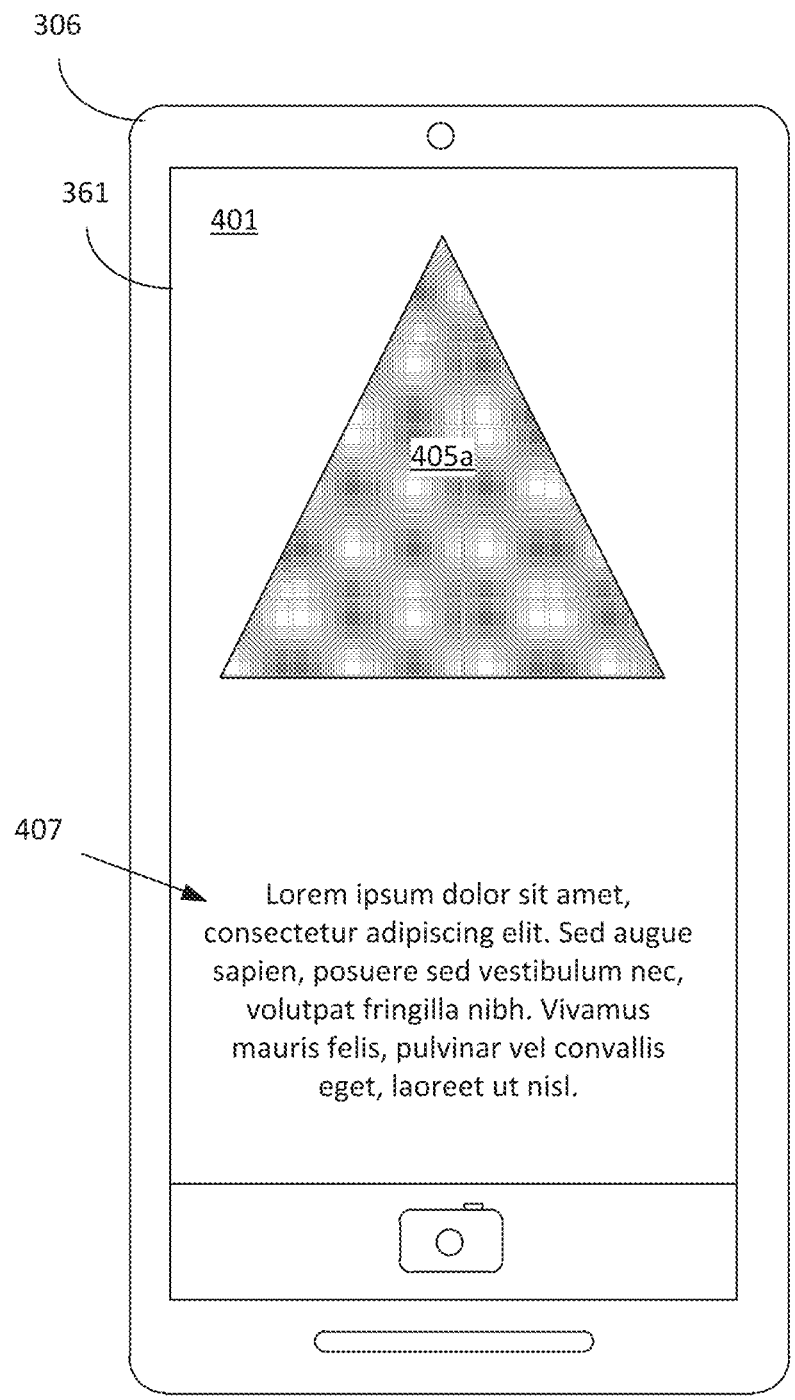
FIGS. 4-5 are diagrams of another example user interface as a document is rendered by a computing device according to various embodiments of the present disclosure.

As illustrated in the example of FIG. 4, the document 401 is presented on the display 361 of a client device 306 that is representative of various possible computing devices. Thus, the client 306 may begin displaying the document 401 by rendering the lowest layer object 405a and other objects specified by the document that are in the same layer, such as the text strings 407. Although the document 401 may specify a blend mode for the object 405a, since the object is the lowest layer object, the result color is the same as the source color of the object 405a itself since there is no pre-existing destination colors with which to blend.

However, the document 401 may include additional layers of objects, some of which may overlap with objects in other layers. The document 401 may also specify one of various possible blend modes for each of the objects that define how the colors of the object should be blended with colors of objects in lower layers. The blend mode specified for an object by the document 401 determines the function used to render the object, where the result color after applying a blend mode is computed as a linear combination of source color, destination color, and the function of source and destination color. Traditionally, the function is computed for each pixel of a blended object using the fragment shader of a graphics processing unit (GPU) for a computing device, where the fragment shader is software-based (albeit software for the GPU). In addition, traditional methods do not allow direct reading of the output texture of the framebuffer from which the destination color needs to be read. Thus, to determine the destination color needed to compute a result color, various workarounds are also needed, such as copying the framebuffer's output texture into another texture and assigning it as an input to the fragment shader.

Using techniques disclosed herein, for some blend modes, such as the Multiply blend mode, the function for the blend mode can be computed using the GPU hardware instead of the fragment shader, resulting in a significant decrease in the time to compute the result color for an object using such blend modes. Additionally, through use of these hardware operations, the destination color may be read by the GPU hardware without requiring the workarounds needed for the traditional methods. The GPU hardware may be configured to perform these blend modes through use of dual-source color blending functionality that may be included as part of various APIs, such as OpenGL™, DirectX™, Metal™, and Vulkan™. For example, in OpenGL the dual-source color blending operation is configured, at least in part, via the glBlendFunc(parameter1,parameter2) and glBlendEquation (parameter) functions. However, these dual-source color blending functions are configured with various predefined parameters representing different operations to be performed by the functions. Thus, in order to utilize the hardware operations, the equation to be solved should be expressed in terms of these predefined parameters.

Using the Multiply blend mode from the Adobe PDF reference and the OpenGL API as an example, the PDF reference defines the equation (including alpha values) for the Multiply blend mode as:

$$(a_b U a_{si})*C_i=(1-a_{si})*a_b*C_b+a_{si}*(1-a_b)*C_{si}+a_{si}*a_b*C_b*C_{si}$$

where
   $a_b$=Backdrop alpha (or Destination alpha)
   $C_b$=Backdrop color (or Destination color)
   $a_{si}$=Source alpha (i.e., alpha of the $i^{th}$ element being composited)
   $C_{si}$=Source color (i.e., color of the $i^{th}$ element being composited)
   $C_i$=Result color (after composition of $i^{th}$ element)

However, the various mathematical operations needed to compute the result color (i.e., $C_i$ above) using the reference equation do not correspond to operations that are defined for the parameters of the dual-source color blending operation for OpenGL. Thus, to be usable for the GPU hardware-based dual-source color blending operation, the reference equation should be transformed such that its components correspond to the predefined parameters of the operation. As a step in the transformation of the equation, the various alpha values can be pre-multiplied, resulting in the equation:

$$aC_i=(1-a_{si})*aC_b+(1-a_b)*aC_{si}+aC_b*aC_{si}$$

where
   $aC_b$=Pre-multiplied Backdrop color (or Pre-multiplied Destination color)
   $aC_{si}$=Pre-multiplied Source color
   $aC_i$=Pre-multiplied Result color With consideration given to non-isolated transparency groups, the equation above becomes:

$$aC_i=(1-a_{si})*aC_b+(1-(a_b U a_0))*aC_{si}+aC_b*aC_{si}$$

where
   $a_0$=The alpha before the start of a non-isolated transparency group

Simplifying, the above equation becomes:

$$aC_i=(1-a_{si})*aC_b+(1-a_b-a_0+a_b*a_0)*aC_{si}+aC_b*aC_{si}$$

$$aC_i=(1-a_0)*(1-a_b)*aC_{si}+(1-a_{si}+aC_{si})*aC_b$$

$$aC_i=[(1-a_b)]*[(1-a_0)*aC_{si}]+[(1-a_{si}+aC_{si})]*[aC_b]$$

At this point, portions of the transformed equation for the Multiply blending mode can be represented by parameters used in the functions glBlendFunc(param1,param2) and glBlendEquation(param) for the dual-source color blending operation of OpenGL. When executed, the glBlendFunc( ) function multiplies the value of the first predefined parameter (param1) by a value returned by a user-specified function for the source color, while it also multiplies the value of the second predefined parameter (param2) by the destination color, where the GPU hardware reads the destination color without resorting to workarounds implemented by the fragment shader. Thus, in order to compute the Multiply blend mode using the GPU hardware, the source color variable defined in the fragment shader is assigned $[(1-a_0)*aC_{si}]$ that is a "first portion" of the transformed Multiply blend equation, while the dual-source color variable defined in the fragment shader is assigned $[(1-a_{si}+aC_{si})]$ that is a "second portion" of the transformed Multiply blend equation.

The glBlendFunc( ) function is configured with the first predefined parameter GL_ONE_MINUS_DST_ALPHA corresponding to $[(1-a_b)]$, a "remaining portion" of the transformed Multiply blend equation, and the second predefined parameter is GL_SRC1_COLOR corresponding to the value of dual-source color variable in the fragment shader. The glBlendEquation( ) function is configured with a parameter GL_FUNC_ADD that instructs the GPU hardware to add the two products resulting from the two multiplication operations performed by glBlendFunc( ). Configuring these API-defined functions for the dual-source color blending operation performed by the GPU hardware may also be referred to generally as configuring the circuitry of the GPU or configuring the dual-source circuitry of the GPU.

As a result, when the glBlendFunc(GL_ONE_MINUS_DST_ALPHA, GL_SRC1_COLOR) function is executed, following configuration of the source color and dual-source color, the GPU hardware performs two multiplication operations:

$$GL\_ONE\_MINUS\_DST\_ALPHA (i.e., [(1-a_b)])$$
$$*$$
$$\text{assigned source color value (i.e., } [(1-a_0)*aC_{si}])$$
$$AND$$
$$GL\_SRC1\_COLOR \text{ (i.e., assigned dual-source color value}$$
$$[(1-a_{si}+aC_{si})])$$
$$*$$
$$\text{destination color (i.e., } [aC_b])$$

When the glBlendEquation(GL_FUNC_ADD) function is then executed, the result is the addition between two portion of the transformed equation, namely $$[(1-a_b)]*[(1-a_0)*aC_{si}]$$
$$+$$
$$[(1-a_{si}+aC_{si})]*[aC_b]$$

As a result of the configuration performed, the dual-source color blending operation is executed to determine the pre-multiplied result color ($aC_i$) for each pixel of a blended object using the GPU hardware-based operations. It should be noted that the calculation of the result color using the dual-source color blending operation is possible due to transforming the reference Multiply blend mode equation that allow portions of the transformed equation to be expressed using predefined parameters for dual-source color blending (e.g., GL_ONE_MINUS_DST_ALPHA), as well as structuring the transformed equation such that the destination color is only a single term, unlike in the reference form of the equation. While the detailed example described above is for the Multiply blend mode using the OpenGL API, it is possible to use dual-source color blending to implement, in GPU hardware, other blend modes using other APIs. In addition, it is also possible to produce other mathematically equivalent variants (which use different predefined parameters than in the example) of the Multiply blend mode equation conducive to dual-source blending.

Returning to FIG. 4, the blend mode specified for an object by the document 401 determines the function used to render the object. Following rendering of the object 405a, the document manipulation engine 321 determines the blending mode for any additional objects to be rendered in the document 401. Upon determining that the document 401 specifies rendering a second object at a layer above the object 405a using, for example, the Multiply blend mode, the document manipulation engine 321 determines that a transform of the Multiply blend mode equation is to be used to configure the dual-source color blending operation to calculate the result color for pixels of the object. The particular transformed equation used may depend upon the API used and the predefined parameters available to the dual-source color blending functions of the API. It should be noted that depending upon the particular implementation of the document manipulation engine 321, the rendering and dual-source color blending operation used to determine the result color may be performed by a GPU of the computing environment 303, by a GPU of the client 306, or a combination of both.

As described above, for OpenGL, the configuration includes assigning a first portion of the transformed Multiply blend equation (i.e., $[(1-a_o)*aC_{si}]$) to the source color variable defined in the fragment shader, and assigning a second portion of the transformed Multiply blend equation (i.e., $[(1-a_{si}+aC_{si})]$) to the dual-source color variable that is also defined in the fragment shader, where $aC_{si}$ represents the pre-multiplied source color of the second object itself. The glBlendFunc( ) function is configured as glBlendFunc (GL_ONE_MINUS_DST_ALPHA, GL_SRC1_COLOR), while the glBlendEquation( ) function is configured as glBlendEquation(GL_FUNC_ADD).

Figure 5:
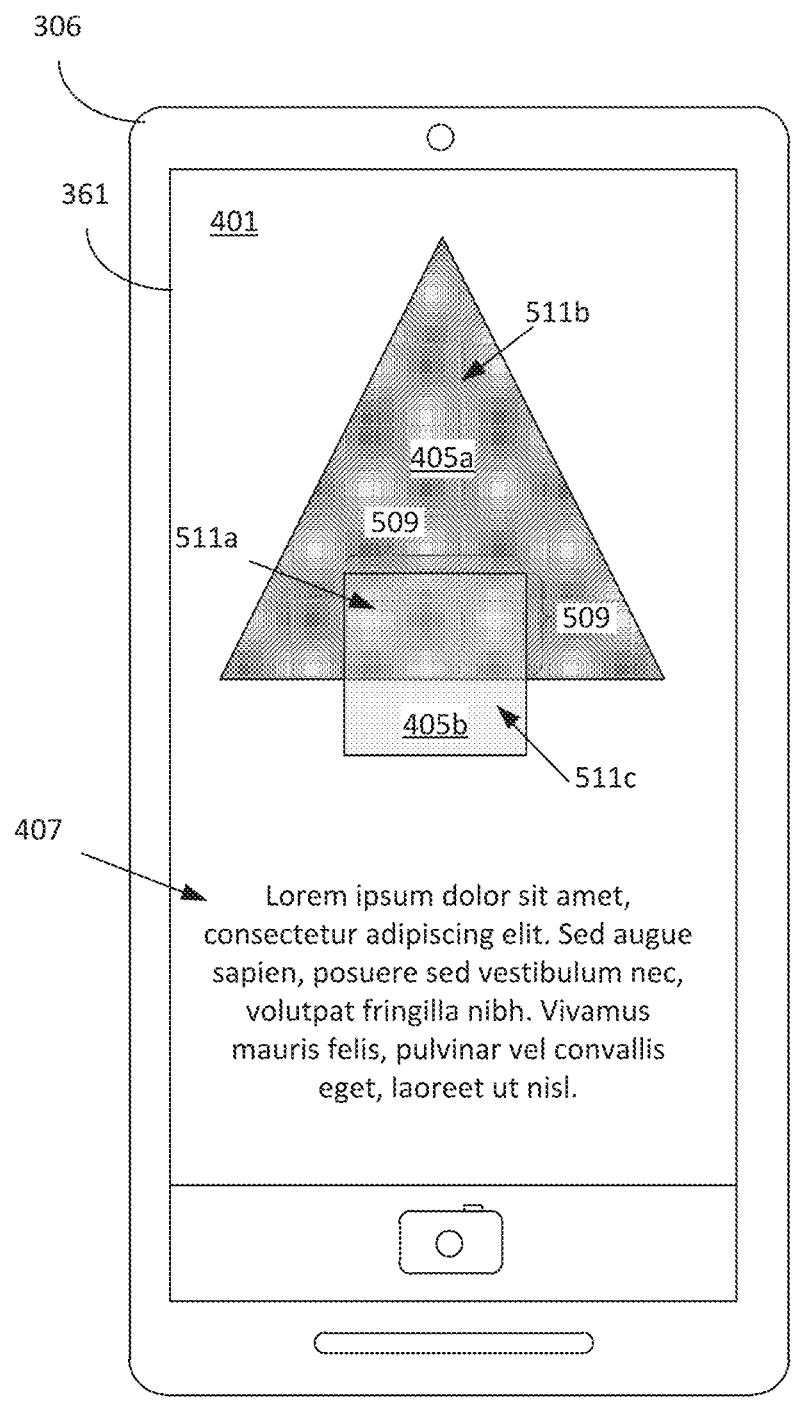

Then, for each pixel of at least the portion of the second object that overlaps with object 405a, the dual-source color blending operation is executed to determine the pre-multiplied result color ($aC_i$) using the GPU hardware-based operations. Following the determination of the result color, the second object is rendered to the display 361 of the client 306, such as shown in FIG. 5, where the second object is represented as object 405b. Here, the overlapping portion 509 is shown with a result color 511a that is an approximate representation of a Multiply blended color of destination color 511b and source color 511c.

Figure 6:
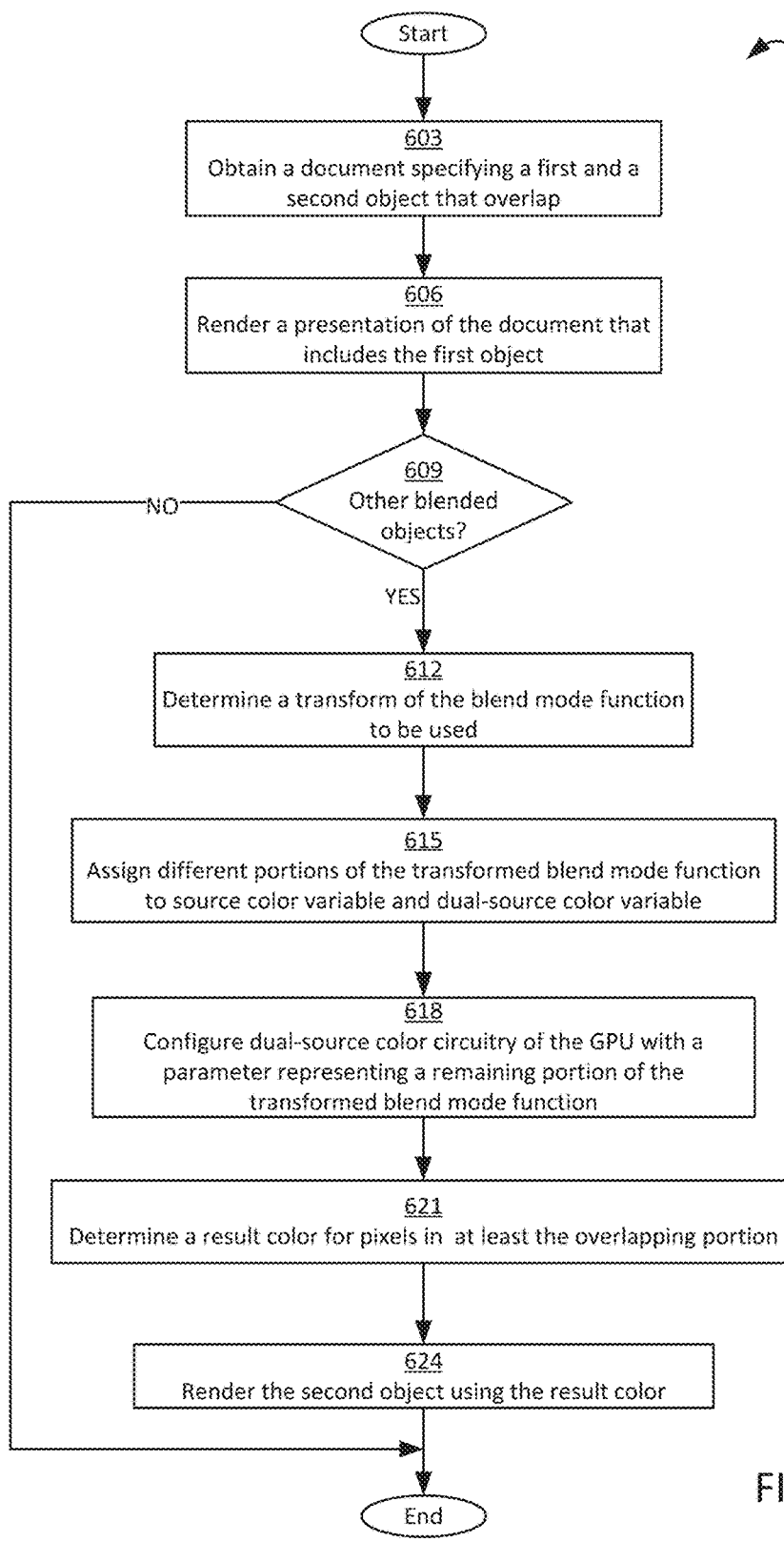
FIG. 6 is a flowchart illustrating one example of functionality implemented as portions of a document manipulation engine executed in a computing device according to various embodiments of the present disclosure.

Referring next to FIG. 6, shown is a flowchart that provides one example of the operation of a portion of the document manipulation engine 321 according to various embodiments. It is understood that the flowchart of FIG. 6 provides merely an example of the many different types of functional arrangements that may be employed to implement the operation of the portion of the document manipulation engine 321 as described herein. As an alternative, the flowchart of FIG. 6 may be viewed as depicting an example of elements of a method implemented in the computing environment 303 (FIG. 3) or like computing device according to one or more embodiments.

Beginning with block 603, the document manipulation engine 321 obtains a document that specifies a first and second object that overlap during a presentation of the document. The document may be received from a data store 312 (FIG. 3), a client device 306 (FIG. 3), and/or from another computing device accessible via the network 309 (FIG. 3). The document may be in one of various formats, such as PDF, HTML, XML, SVG, AI, PS, EPS, and/or other possible formats as can be appreciated.

Next, in block 606, the document manipulation engine 321 initiates rendering a presentation of the document on a display of a computing device, such as the client 306, where the rendered presentation includes the first object. In some embodiments, the rendering may be performed by a GPU of the computing environment 303, by a GPU of the client 306, or a combination of both.

Then, in block 609, the document manipulation engine 321 determines whether the document specifies a second object to be blended with the first object in a presentation of the document. If not, this portion of the execution of the document manipulation engine 321 ends as shown. Alternatively, if another object to be blended exists in the document, in block 612, the document manipulation engine 321 determines a transform of a blend mode function (also referred to as a "blend mode equation") with which to perform the blending using dual-source color blending operation of the GPU hardware. As an example, for document objects using the Multiply blend mode, a transformed function of the Multiply blend mode may be used. As noted, determining a result color for a blended object using the dual-source color blending operation is possible when the transformed equation can be expressed using predefined parameters for dual-source color blending (e.g., the GL_ONE_MINUS_DST_ALPHA parameter).

Continuing, in block 615, the document manipulation engine 321 assigns different portions of the transformed blend mode function to the source color variable and the dual-source color variable. For example, when the Multiply blend mode is used, the source color variable defined in the fragment shader is assigned a first portion of the transformed Multiply blend function (i.e., $[(1-a_o)*aC_{si}]$), while the dual-source color variable defined in the fragment shader is assigned a second portion of the transformed Multiply blend function (i.e., $[(1-a_{si}+aC_{si})]$).

Next, in block 618, the document manipulation engine 321 configures the dual-source color circuitry of the GPU using parameters representing a remaining portion of the transformed blend mode function. For example, when the Multiply blend mode is used with the OpenGL API, the glBlendFunc( ) function is configured with the first predefined parameter GL_ONE_MINUS_DST_ALPHA corresponding to $[(1-a_b)]$, a remaining portion of the transformed Multiply blend function, and the second predefined parameter is GL_SRC1_COLOR corresponding to the value of dual-source color variable in the fragment shader. The glBlendEquation( ) function is configured with a parameter GL_FUNC_ADD that instructs the GPU hardware to add the two products resulting from the two multiplication operations performed by glBlendFunc( ).

Subsequently, in block 621, for each pixel of at least the portion of the second object that overlaps with first object, the document manipulation engine 321 executes the dual-source color blending operation to determine the pre-multiplied result color ($aC_i$) using the GPU hardware-based operations. In some embodiments of the document manipulation engine 321, the dual-source color blending operation used to determine the result color may be performed by a GPU of the computing environment 303, by a GPU of the client 306, or a combination of both.

Then, in block 624, the document manipulation engine 321 initiates rendering of the second object to a display of a computing device, such as the display 361 (FIG. 3) of the client 306. In some embodiments of the document manipulation engine 321, the rendering of the second object may be performed by a GPU of the computing environment 303, by a GPU of the client 306, or a combination of both. Thereafter, this portion of the execution of the document manipulation engine 321 ends as shown.

Figure 7:
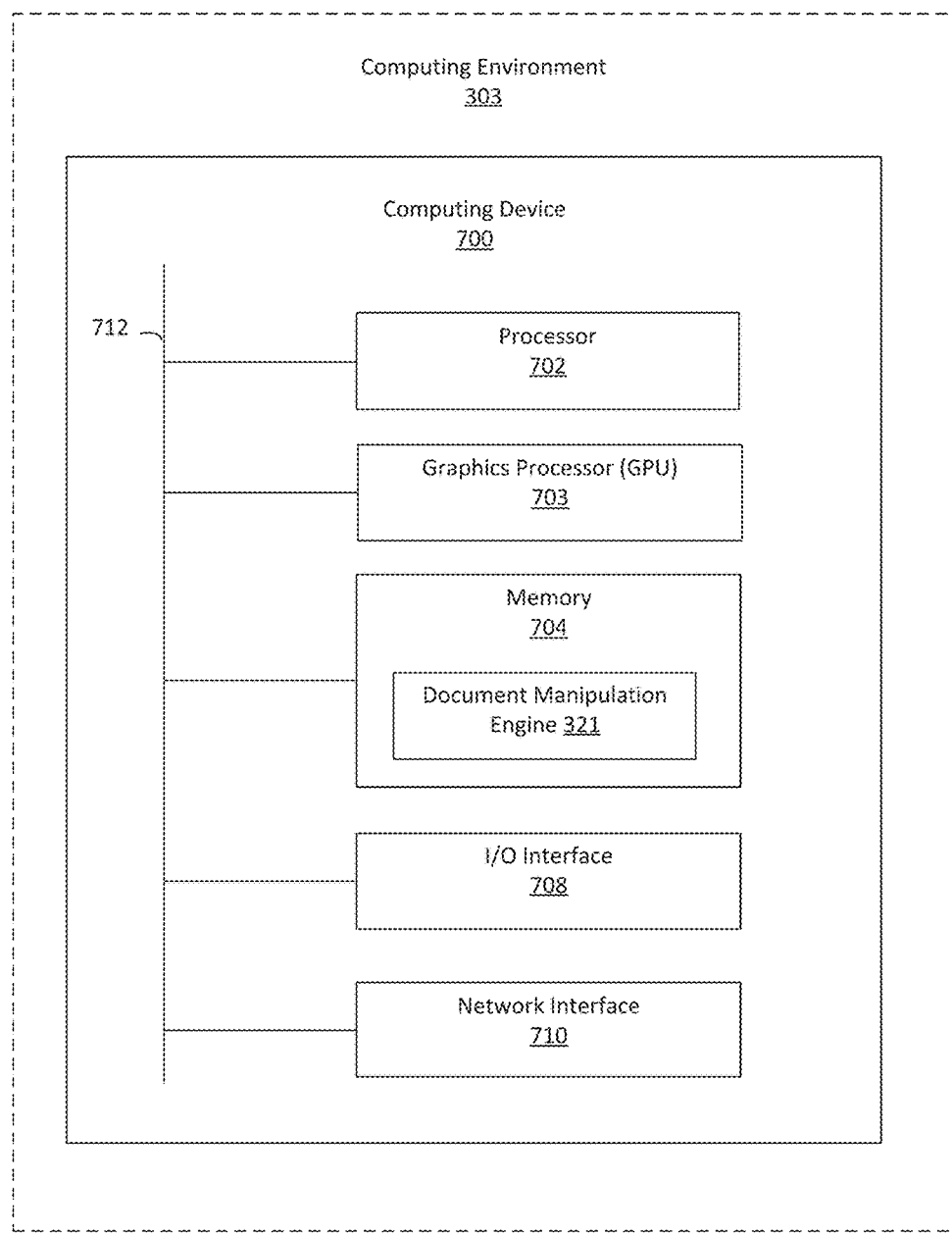
FIG. 7 is a schematic block diagram that provides one example illustration of a computing environment employed in the networked environment of FIG. 3 according to various embodiments of the present disclosure.

With reference to FIG. 7, shown is a schematic block diagram of the computing environment 303 according to an embodiment of the present disclosure. The computing environment 303 includes one or more computing devices 700. Each computing device 700 includes at least one processor circuit, for example, having a processor 702, a graphics processor (GPU) 703, a memory 704, an I/O interface 708, and a network interface 710, all of which are coupled to a local interface 712. To this end, each computing device 700 may comprise, for example, at least one server computer or like device. The I/O interface 708 can interface with various devices, both locally attached and remote, for receiving and transmitting data, such as displays (including touch-sensitive displays), cameras, microphones, keyboards, mice, etc. The local interface 712 may comprise, for example, a data bus with an accompanying address/control bus or other bus structure as can be appreciated.

Stored in the memory 704 are both data and several components that are executable by the processor 702. In particular, stored in the memory 704 and executable by the processor 702 is the document manipulation engine 321, and potentially other applications. Also stored in the memory 704 may be a data store and other data. In addition, an operating system may be stored in the memory 704 and executable by the processor 702.

It is understood that there may be other applications that are stored in the memory 704 and are executable by the processor 702 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 704 and are executable by the processor 702 in combination with the GPU 703. In this respect, the term "executable" means a program file that is in a form that can ultimately be run by the processor 702 in combination with the GPU 703. Examples of executable programs may be, for example, a compiled program that can be translated into machine code in a format that can be loaded into a random access portion of the memory 704 and run by the processor 702 in combination with the GPU 703, source code that may be expressed in proper format such as object code that is capable of being loaded into a random access portion of the memory 704 and executed by the processor 702 in combination with the GPU 703, or source code that may be interpreted by another executable program to generate instructions in a random access portion of the memory 704 to be executed by the processor 702 in combination with the GPU 703, etc. An executable program may be stored in any portion or component of the memory 704 including, for example, random access memory (RAM), read-only memory (ROM), hard drive, solid-state drive, USB flash drive, memory card, optical disc such as compact disc (CD) or digital versatile disc (DVD), magnetic tape, or other memory components.

The memory 704 is defined herein as including both volatile and nonvolatile memory and data storage components. Volatile components are those that do not retain data values upon loss of power. Nonvolatile components are those that retain data upon a loss of power. Thus, the memory 704 may comprise, for example, random access memory (RAM), read-only memory (ROM), hard disk drives, solid-state drives, USB flash drives, memory cards accessed via a memory card reader, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The processor 702 and GPU 703 may each represent multiple such processors and/or multiple processor cores. The memory 704 may represent multiple memories 704 that operate in parallel processing circuits. In such a case, the local interface 712 may be an appropriate network that facilitates communication between any such components, such as between any two of the multiple processors 702, between the GPU 703 and memory 704, etc. The local interface 712 may comprise additional systems designed to coordinate this communication, including, for example, performing load balancing. The processor 702 and GPU 703 may be of electrical or of some other available construction.

Although the document manipulation engine 321 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 6 shows the functionality and operation of an implementation of portions of the document manipulation engine 321. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 702 in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the document manipulation engine 321, that comprises software or code can be embodied in any non-transitory computer-readable medium for use by or in connection with an instruction execution system such as, for example, a processor 702 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the document manipulation engine 321, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices in the same computing environment 303. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
obtaining, by a computing device, a document specifying a first object and a second object presented in the document, wherein a portion of the second object overlaps the first object;
rendering, on a display of the computing device, a presentation of the document, the rendered presentation including the first object of the document; and
performing, in response to determining that the document specifies blending a color of the second object with a color of the first object using a blend mode in the overlapping portion:
determining a Multiply blend mode function associated with the blend mode;
determining a transform of the Multiply blend mode function in pre-multiplied alpha mode;
configuring, via a graphics processing unit (GPU) of the computing device, fragment shader software to assign (i) a first portion of the transformed Multiply blend mode function to a source color variable and (ii) a second portion of the transformed Multiply blend mode function to a dual-source color variable, wherein each of the first and second portions includes the color of the second object using a pre-multiplied alpha;
configuring dual-source color circuitry of hardware of the GPU with a parameter representing a remaining portion of the transformed Multiply blend mode function that includes a destination alpha;
executing, via the configured dual-source color circuitry, at least one hardware operation based on one or more of the source color variable or the dual-source color variable, wherein the hardware of the GPU determines a destination color of the overlapping portion based on the at least one hardware operation;
for each pixel of the overlapping portion, determining a result color using the dual-source color circuitry of the GPU to compute the transformed Multiply blend mode function; and
rendering, on the display of the computing device, the second object of the document using the result color for each pixel of the overlapping portion.

2. The method of claim 1, wherein the dual-source color circuitry is configured via an application programming interface (API) for the GPU.

3. The method of claim 2, wherein the API is selected from the group consisting of OpenGL, DirectX, Metal, and Vulkan.

4. The method of claim 1, wherein:
the first portion of the transformed Multiply blend mode function assigned to the source color variable is $[(1-a_०)*aC_{si}]$, and the second portion of the transformed Multiply blend mode function assigned to the dual-source color variable is $[(1-a_{st}+aC_{si})]$.

5. The method of claim 1, wherein the destination color is based on the color of the first object using pre-multiplied alpha, and a value assigned to the source color variable is based on the color of the second object using pre-multiplied alpha, wherein the transformed Multiply blend mode function includes the source color and the destination color.

6. The method of claim 1, further comprising configuring the dual-source color circuitry of the GPU with a second parameter that instructs the dual-source color circuitry to multiply the dual-source color with the destination color.

7. The method of claim 1, wherein the document is formatted to comply with a portable document format (PDF) standard, and the PDF standard defines the blend mode.

8. The method of claim 1, wherein the first object and the second object each comprise at least one of a raster graphics image or a vector graphics image.

9. The method of claim 1, wherein the document specifies a plurality of other objects that overlap with the first object and the second object, the document specifying blend modes for blending the other objects with the first object and the second object.

10. The method of claim 9, wherein the objects specified in the document are assigned to transparency groups that define, at least in part, how objects in one transparency group are blended with objects in another transparency group.

11. The method of claim 1, wherein executing the at least one hardware operation comprises:
  executing, via the configured dual-source color circuitry, a first hardware operation, wherein the first hardware operation determines a first product based on the first portion assigned to the source color variable of the fragment shader and a second product based on the second portion assigned to the dual-source color variable of the fragment shader; and
  executing, via the configured dual-source color circuitry, a second hardware operation, wherein the second hardware operation determines a sum of the first product and the second product.

12. A non-transitory computer-readable medium embodying program code for modifying an initial workspace for a newly initialized application instance, the program code comprising instructions which, when executed by a processor, cause the processor to perform operations comprising:
  obtaining, by a computing device, a document specifying a first object and a second object presented in the document, wherein a portion of the second object overlaps the first object;
  rendering, on a display of the computing device, a presentation of the document, the rendered presentation including the first object of the document; and
  performing, in response to determining that the document specifies blending a color of the second object with a color of the first object using a blend mode in the overlapping portion:
    determining a Multiply blend mode function associated with the blend mode;
    determining a transform of the Multiply blend mode function in pre-multiplied alpha mode;
    configuring, via a graphics processing unit (GPU) of the computing device, fragment shader software to assign (i) a first portion of the transformed Multiply blend mode function to a source color variable and (ii) the second portion of the transformed Multiply blend mode function to a dual-source color variable, wherein each of the first and second portions includes the color of the second object using a pre-multiplied alpha;
    configuring dual-source color circuitry of hardware of the GPU with a parameter representing a remaining portion of the transformed Multiply blend mode function that includes a destination alpha;
    executing, via the configured dual-source color circuitry, at least one hardware operation based on one or more of the source color variable or the dual-source color variable, wherein the hardware of the GPU determines a destination color of the overlapping portion based on the at least one hardware operation;
    for each pixel of at least the overlapping portion, determining a result color using the dual-source color circuitry of the GPU to compute the transformed Multiply blend mode function; and
    rendering, on the display of the computing device, the second object of the document using the result color for each pixel of the overlapping portion.

13. The non-transitory computer-readable medium of claim 12, wherein the dual-source color circuitry is configured via an application programming interface (API) for the GPU.

14. The non-transitory computer-readable medium of claim 12, wherein the destination color is based on the color of the first object using pre-multiplied alpha, and a value assigned to the source color variable is based on the color of the second object using pre-multiplied alpha, wherein the transformed Multiply blend mode function includes the source color and the destination color.

15. The non-transitory computer-readable medium of claim 12, further comprising configuring the dual-source color circuitry of the GPU with a second parameter that instructs the dual-source color circuitry to multiply the dual-source color with the destination color.

16. A system, comprising:
  at least one computing device; and
  a document manipulation engine executed in the at least one computing device, the document manipulation engine comprising logic that:
    obtains a document specifying a first object and a second object presented in the document, wherein a portion of the second object overlaps the first object;
    renders, on a display device, a presentation of the document, the rendered presentation including the first object of the document; and
    performs, in response to determining that the document specifies blending a color of the second object with a color of the first object using a blend mode in the overlapping portion:
      determining a Multiply blend mode function associated with the blend mode;
      determining a transform of the Multiply blend mode function in pre-multiplied alpha mode;
      configuring, via a graphics processing unit (GPU) of the computing device, fragment shader software to assign (i) a first portion of the transformed Multiply blend mode function to a source color variable and (ii) a second portion of the transformed Multiply blend mode function to a dual-source color variable, wherein each of the first and second portions includes the color of the second object using a pre-multiplied alpha;
      configuring dual-source color circuitry of hardware of the GPU with a parameter representing a remaining portion of the transformed Multiply blend mode function that includes a destination alpha;

executing, via the configured dual-source color circuitry, at least one hardware operation based on one or more of the source color variable or the dual-source color variable, wherein the hardware of the GPU determines a destination color of the overlapping portion based on the at least one hardware operation;

for each pixel of the overlapping portion, determining a result color using the dual-source color circuitry of the GPU to compute the transformed Multiply blend mode function; and rendering, on the display device, the second object of the document using the result color for each pixel of the overlapping portion.

17. The system of claim 16, wherein the document manipulation engine further comprises logic that configures the dual-source color circuitry of the GPU with a second parameter that instructs the dual-source color circuitry to multiply the dual-source color with the destination color.

18. The system of claim 16, wherein the document is formatted to comply with a portable document format (PDF) standard, and the PDF standard defines the blend mode.

19. The system of claim 16, wherein the document specifies a plurality of other objects that overlap with the first object and the second object, the document specifying blend modes for blending the other objects with the first object and the second object.

20. The system of claim 16, wherein the objects specified in the document are assigned to transparency groups that define, at least in part, how objects in one transparency group are blended with objects in another transparency group.

* * * * *